United States Patent
Ding et al.

(10) Patent No.: US 10,593,071 B2
(45) Date of Patent: Mar. 17, 2020

(54) NETWORK TRAINING AND ARCHITECTURE FOR MEDICAL IMAGING

(71) Applicant: Siemens Medical Solutions USA, Inc., Malvern, PA (US)

(72) Inventors: Xinhong Ding, Buffalo Grove, IL (US); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 137 days.

(21) Appl. No.: 15/936,924

(22) Filed: Mar. 27, 2018

(65) Prior Publication Data
US 2018/0300907 A1 Oct. 18, 2018

Related U.S. Application Data

(60) Provisional application No. 62/485,741, filed on Apr. 14, 2017.

(51) Int. Cl.
G06T 11/00 (2006.01)
G06T 7/00 (2017.01)

(52) U.S. Cl.
CPC .......... *G06T 11/005* (2013.01); *G06T 7/0012* (2013.01); *G06T 11/006* (2013.01); *G06T 2207/10104* (2013.01); *G06T 2207/10108* (2013.01); *G06T 2207/20081* (2013.01); *G06T 2207/20084* (2013.01)

(58) Field of Classification Search
CPC ... G06T 11/005; G06T 11/006; G06T 7/0012; G06T 2207/10104; G06T 2207/10108; G06T 2207/20081; G06T 2207/20084
See application file for complete search history.

(56) References Cited

U.S. PATENT DOCUMENTS

| 6,950,494 B2 | 9/2005 | Vija et al. |
| 7,737,406 B2 | 6/2010 | Vija et al. |
| 2010/0010757 A1* | 1/2010 | Schmidt ................. A61B 6/037 702/57 |

(Continued)

OTHER PUBLICATIONS

Glick, Stephen J. et al, "An Analytical Approach for Compensation of Non-Unifrom Attenuation in Cardiac SPECT imaging", Physics in Medicine & Biology 40, Jun. 13, 1995, (pp. 1677-1693), 17 pp.

(Continued)

*Primary Examiner* — Leon Flores

(57) ABSTRACT

A system and method includes acquisition of a plurality of non-attenuation-corrected volumes, each of the non-attenuation-corrected volumes based on a respective one of a plurality of sets of two-dimensional emission data, acquisition of a plurality of attenuation coefficient maps, each of the plurality of attenuation coefficient maps corresponding to a respective one of the plurality of sets of two-dimensional emission data, training of a convolutional network to generate a generated attenuation coefficient map from an input image volume, the training based on the plurality of non-attenuation-corrected volumes and respective ones of the plurality of attenuation coefficient maps, and output of trained kernels of the trained convolutional network to an emission imaging system.

17 Claims, 13 Drawing Sheets

(56) References Cited

U.S. PATENT DOCUMENTS

| | | | |
|---|---|---|---|
| 2011/0158497 A1* | 6/2011 | Schweizer | G01R 33/481 382/131 |
| 2018/0018757 A1* | 1/2018 | Suzuki | G06T 3/4046 |
| 2018/0293762 A1* | 10/2018 | Fu | G06T 11/003 |
| 2018/0315225 A1* | 11/2018 | Zhang | G06T 5/00 |

OTHER PUBLICATIONS

Wallis, Jerold W. et al., "Attenuation Correction in Cardiac SPECT without a Transmission Measurement", Mallinckrodt Institute of Radiology, Washington University School of Medicine, Journal of Nuclear Medicine, 1995, (pp. 506-512), 8 pp.

Maksud, Philippe et al., "Artificial Nueral Network as a Tool to Compensate for Scatter and Attenuation in Radionuclide Imaging", Journal of Nuclear Medicine, 1996, (pp. 735-745), 12 pp.

Kaplan, M.S. et al., "A Differential Attenuation Method for Simultaneous Estimation of SPECT Activity and Attenuation Distributions", IEEE, 1999, (pp. 1678-1683), 6 pp.

Kaplan, M.S. et al., "Comparison of the Differential Attenuation Method for Multi-Emission SPECT with Conventional Methods of Attenuation Compensation", IEEE, 2000, (pp. 879-883), 5 pp.

Zaidi, Habid et al., "Determination of the Attenuation Map in Emission Tomography", Journal of Nuclear Medicine, 2003, (pp. 291-315), 25 pp.

Du, Yong et al., "Model-based compensation for quantitative 123 I brain SPECT imaging", Physics in Medicine & Biology 51, Feb. 15, 2006, (pp. 1269-1282), 14 pp.

Cade, Sarah C. et al. "Use of measured scatter data for the attenuation correction of single photon emission tomography without transmission scanning", Medical Physics 40, Jul. 2013, (pp. 082506-1 through 082506-12) 12 pp.

Berker, Yannick, and Yusheng Li. "Attenuation correction in emission tomography using the emission data—a review." Medical physics 43.2 (2016): 807-832.

Krizhevsky, Alex, Ilya Sutskever, and Geoffrey E. Hinton. "Imagenet classification with deep convolutional neural networks." Advances in neural information processing systems. 2012.

Long, Jonathan, Evan Shelhamer, and Trevor Darrell. "Fully convolutional networks for semantic segmentation." Proceedings of the IEEE conference on computer vision and pattern recognition. 2015.

* cited by examiner

--Prior Art--

NETWORK TRAINING AND ARCHITECTURE FOR MEDICAL IMAGING

CROSS-REFERENCE TO RELATED APPLICATIONS

The present application is related to and claims priority to U.S. Provisional Patent Application No. 62/485,741, filed Apr. 14, 2017, the contents of which are incorporated by reference in their entirety, for all purposes.

BACKGROUND

Conventional medical images may be generated via transmission imaging or emission imaging. According to transmission imaging, the imaging source (e.g., an X-ray source) is external to the subject and the source radiation (e.g., X-rays) is transmitted through the subject to a detector. According to emission imaging, the imaging source (e.g., a gamma ray-emitting radiopharmaceutical) is internal to the subject (e.g., due to injection or ingestion thereof) and the source radiation (e.g., gamma rays) is emitted from within the subject to a detector. In either case, absorption or scattering within the subject tissue attenuates the source radiation prior to reception of the source radiation by the detector.

Images are created by determining the attenuation caused by the subject tissue. This determination is relatively straightforward in the case of transmission imaging, since the amount of the external source radiation being transmitted through the subject and the amount received at the detector are both known. However, the determination of attenuation in emission imaging is more difficult, because the amount of radiation being emitted by the emission source(s) within the subject cannot be measured directly.

Accordingly, in emission imaging such as single-photon-emission-computer-tomography (SPECT) and positron-emission-tomography (PET), image reconstructions incorporate attenuation corrections to generate visually realistic and clinically accurate images. The most common way attenuation corrections are based on Linear Attenuation Coefficient (LAC) maps ("mu-maps") derived from a Computed Tomography (CT) scan of the subject tissue. Such a CT scan is typically performed during the same imaging session at which the emission imaging is performed.

FIG. 1 illustrates conventional attenuation-corrected reconstruction. A set of two-dimensional emission images (i.e., emission data) is acquired and a CT scan is performed substantially contemporaneously to acquire CT data. For example, emission data of a portion of a patient may be acquired while the patient is positioned in an imaging position, and CT data of a similar portion of the patient may be acquired via a CT scan while the patient remains substantially in the imaging position. A transform is applied to the CT data to generate a mu-map. Several techniques exist generating a mu-map from CT data. Lastly, a reconstruction process generates an attenuation-corrected volume based on the emission data and the mu-map.

The CT scan required to generate the mu-map undesirably delivers a corresponding radiation dose to the subject tissue. Also, some emission imaging scenarios lack the availability of a contemporaneous CT scan. What is needed are efficient systems to reconstruct emission data with attenuation correction without requiring a CT scan. Attempts to address this need have utilized Radon transform and image segmentation to estimate a mu-map but have not received satisfactory results in terms of quality of the resulting reconstructed image and/or ease of use.

DETAILED DESCRIPTION

The following description is provided to enable any person in the art to make and use the described embodiments and sets forth the best mode contemplated for carrying out the described embodiments. Various modifications, however, will remain apparent to those in the art.

Some embodiments provide a network training architecture and a network to generate a mu-map based on emission data. Accordingly, some embodiments provide technical improvements over existing systems which require a separate CT scan and its resultant additional radiation dose, and/or which produce unsatisfactory mu-map estimations from emission data and resulting poor quality reconstructed images. One such technical improvement is the ability to generate medical images which are more precise and/or require less radiation exposure than existing systems.

The network training described below generates parameter values for the kernels of a fully convolutional network. Advantageously, a fully convolutional network comprising thusly-parameterized kernels may be efficiently incorporated within a SPECT or PET reconstruction algorithm to generate a mu-map prior to reconstruction of emission data based on the mu-map, without requiring any additional user interaction.

Figure 2:
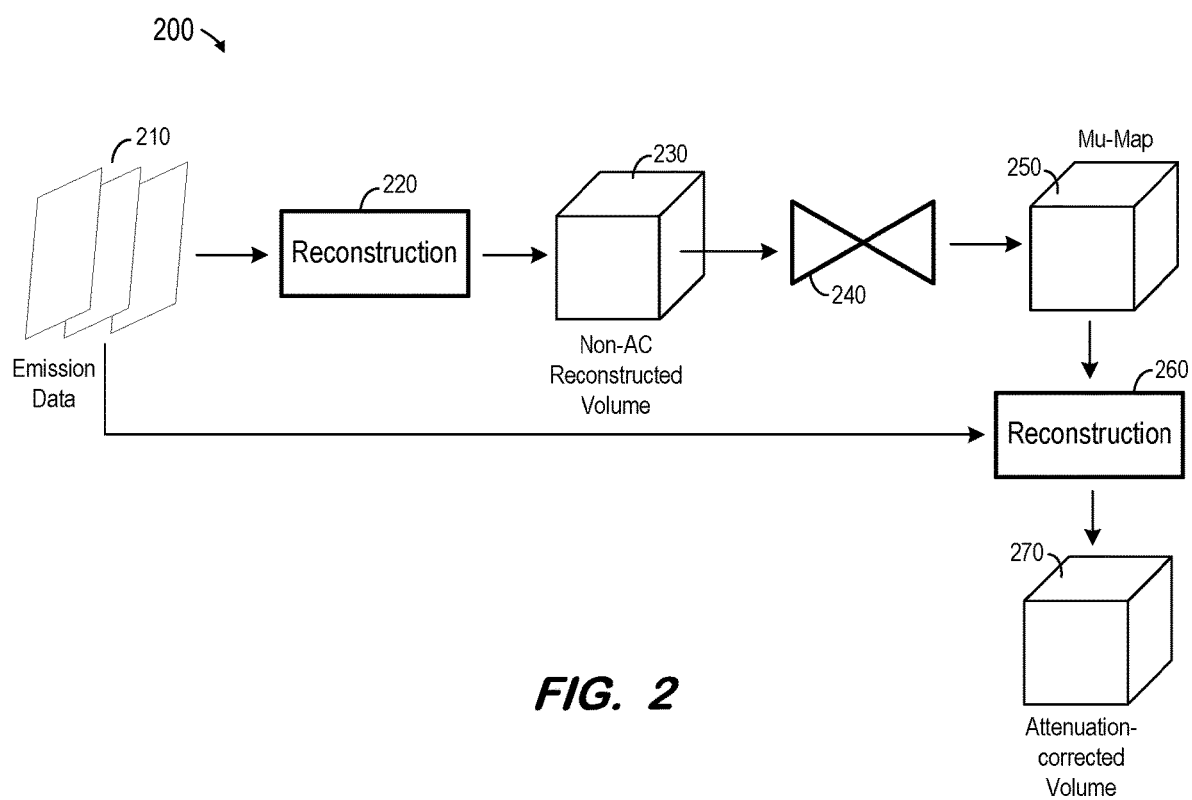
FIG. 2 is a block diagram of a system to generate an attenuation-corrected image volume based on emission data and a trained convolutional neural network according to some embodiments.

FIG. 2 illustrates deployment of a trained network according to some embodiments. Architecture 200 includes a plurality of sets of two-dimensional emission data 210 generated by an emission imaging system during a scan of a subject. As described above, such a system may comprise a SPECT system, a PET system, or another type of emission imaging system that is or becomes known. Emission data 210 may represent data which is typically reconstructed into volumetric image data as is known in the art.

Emission data 210 is received by reconstruction unit 220. Reconstruction unit 220 perform a reconstruction operation on emission data 210 and output non-attenuation-corrected reconstructed volume 230 as is known. Reconstruction unit 220 may execute any suitable reconstruction process that is or becomes known.

Volume 230 is input to trained network 240. Trained network 240 may comprise a fully convolutional neural network having parameters trained as described herein. Network 240 may comprise any type of learning network that is or becomes known, including but not limited to a convolutional neural network.

Network 240 is designed to receive a non-attenuation-corrected reconstructed volume and output a mu-map 250. According to some embodiments, network 240 includes a down-convolution portion and an up-convolution portion. The down-convolution portion consists of a set of convolution layers, with the kernel size of each subsequent layer being less than or equal to the prior layer in order to capture increasingly fine-structured features of an input image. The up-convolution portion also includes a set of convolution layers, with the kernel size of each subsequent layer being greater than or equal to the prior layer in order to generate an output image of the same size as the input image.

Figure 1:
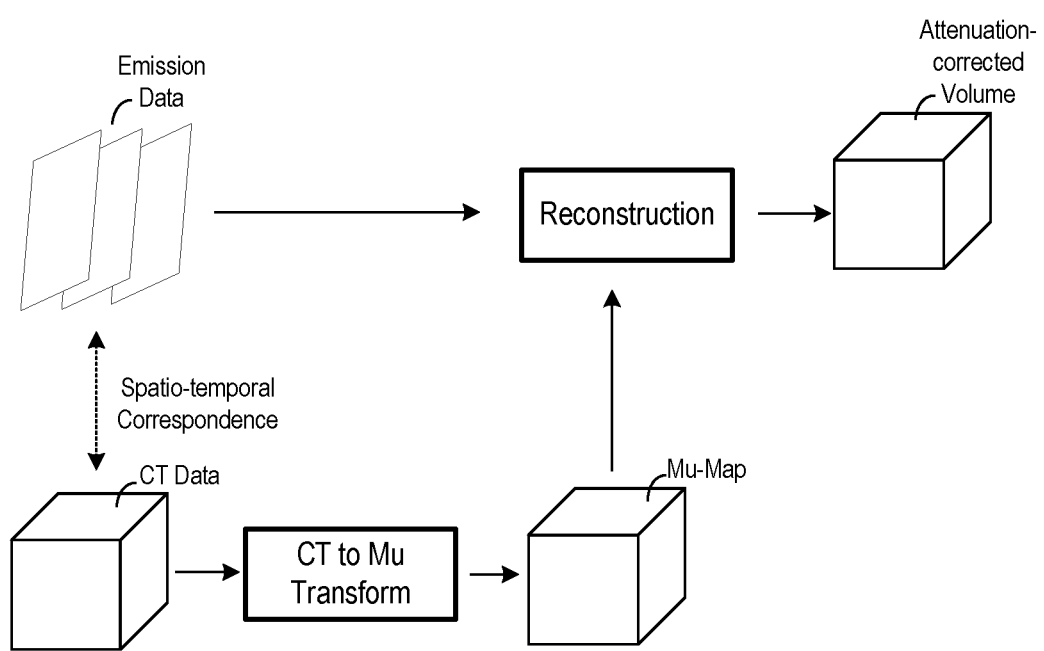
FIG. 1 is a block diagram of a system to generate an attenuation-corrected image volume based on emission data and CT data.

As described with respect to FIG. 1, reconstruction unit 260 then generates attenuation-corrected volume 270 of the subject using emission data 210 and mu-map 250. Unlike the system of FIG. 1, attenuation-corrected volume 270 is generated without requiring a CT scan of the subject. Reconstruction unit 260 may be implemented by the same combination of hardware and software as reconstruction unit 220, or by a different combination.

Reconstruction unit 220, network 240, reconstruction unit 260, and each functional component described herein may be implemented in computer hardware, in program code and/or in one or more computing systems executing such program code as is known in the art. Such a computing system may include one or more processing units which execute processor-executable program code stored in a memory system. Network 240 may comprise hardware and software specifically-intended for executing algorithms based on a specified network architecture and trained kernel parameters.

Figure 3:
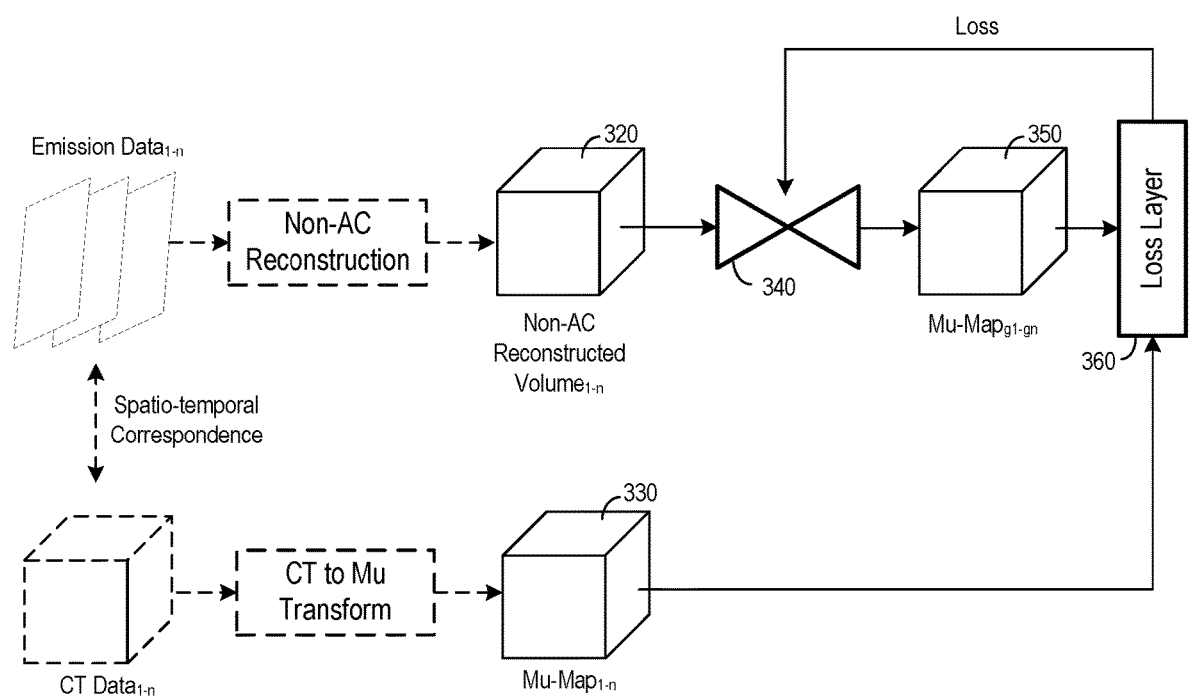
FIG. 3 is a block diagram of a system to train a convolutional neural network to output a linear attenuation coefficient map according to some embodiments.

FIG. 3 illustrates training of network 340 to generate mu-maps according to some embodiments. As is known in the art, training of network 340 involves determining a loss based on the output of network 340 and iteratively modifying network 340 based on the loss until the loss reaches an acceptable level or training otherwise terminates (e.g., due to time constraints or to the loss asymptotically approaching a lower bound).

Figure 4:
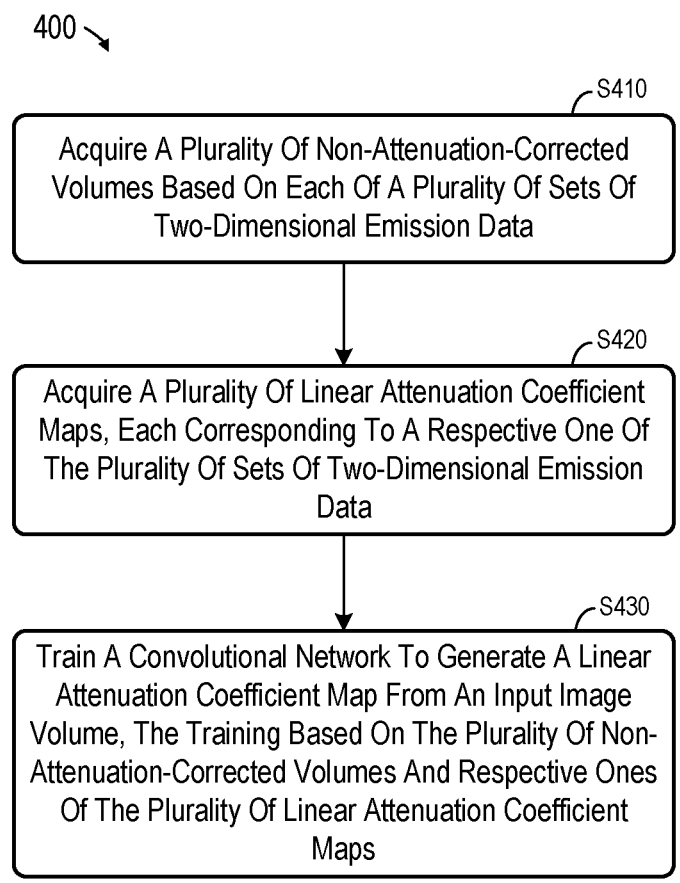
FIG. 4 is a flow diagram of a network training process according to some embodiments.

FIG. 4 is a flow diagram of process 400 to describe the training depicted in FIG. 3 according to some embodiments. Process 400 and the other processes described herein may be performed using any suitable combination of hardware and software. Software program code embodying these processes may be stored by any non-transitory tangible medium, including a fixed disk, a volatile or non-volatile random access memory, a floppy disk, a CD, a DVD, a Flash drive, or a magnetic tape. Embodiments are not limited to the examples described below.

Figure 5:
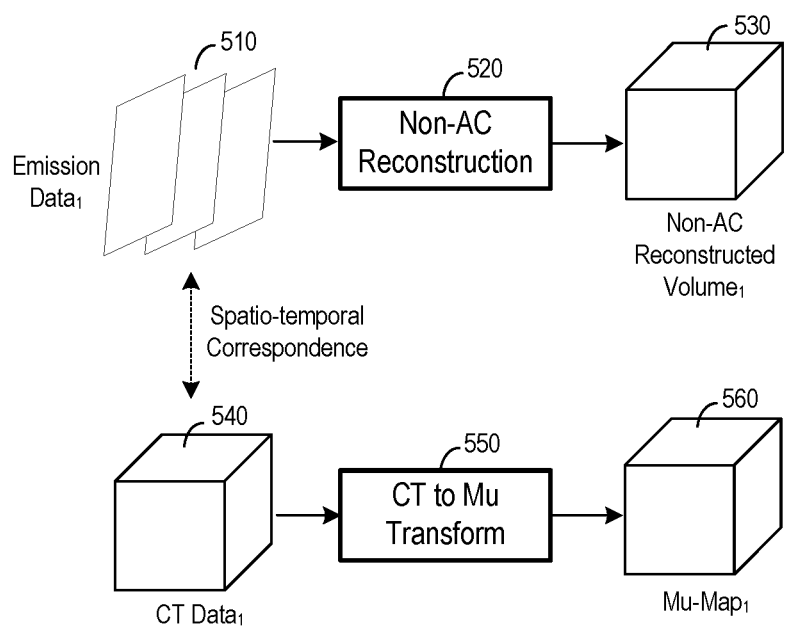
FIG. 5 is a block diagram illustrating acquisition of labeled training data according to some embodiments.

Training data is initially acquired at S410. The training data may comprise a plurality of non-attenuation-corrected volumes which have been reconstructed based on respective sets of two-dimensional image data. FIG. 5 depicts the generation of the acquired training data according to some embodiments. Emission data$_1$ 510 is received by reconstruction unit 520, which performs a reconstruction operation on emission data$_1$ 510 and outputs corresponding non-attenuation-corrected reconstructed volume$_1$ 530. This process repeats for a plurality of emission data$_{2-n}$, resulting in respective reconstructed volumes$_{2-n}$.

Additional training data is acquired at S420. This training data comprises a plurality of linear attenuation coefficient maps (i.e., mu-maps). Each mu-map corresponds to a respective one of the plurality of sets of two-dimensional emission data. For example, CT data$_1$ 540 of FIG. 5 is acquired at the same time as, or shortly before or after, emission data$_1$ 510 as described above. Transform 550 is applied to CT data$_1$ 540 to generate mu-map$_1$ 560. Accordingly, mu-map$_1$ 560 corresponds to emission data$_1$ 510. This process is executed for each set of emission data$_{2-n}$, resulting in respective mu-maps$_{2-n}$.

According to some embodiments, the conversion of CT data to a mu-map includes receiving output pixel data for a pixel of a CT image. The value of the pixel data is compared to a predetermined range. If the value is within the predetermined range, a linear attenuation coefficient is calculated from the pixel data using a first conversion function corresponding to the predetermined range. If the value is outside the predetermined range, the linear attenuation coefficient is calculated from the pixel data using a second conversion function corresponding to a range outside the predetermined range. The calculated coefficient is stored in a memory as part of a mu-map, and the process repeats for each other pixel of the CT image.

A convolutional network is trained at S430 to generate a linear attenuation coefficient map from an input image volume. The training is based on the plurality of non-attenuation-corrected volumes and respective ones of the plurality of linear attenuation coefficient maps.

The dashed lines of FIG. 3 represent components involved in the generation of training data, rather than the training process, and are included to promote understanding thereof. As described above, a plurality of non-attenuation-corrected volumes$_{1-n}$ 320 are acquired at S410 and a plurality of respective mu-maps$_{1-n}$ are acquired at S420.

During training, network 340 receives non-attenuation-corrected volumes$_{1-n}$ 320 and generates a mu-map$_{g1-gn}$ 350 for each received volume. Loss layer component 360 determines a loss by comparing each generated mu-map$_{g1-gn}$ 350 to a corresponding "ground truth" mu-map', 330. For example, network 340 generates mu-map$_{g20}$ based on non-attenuation-corrected volume$_{20}$ which was reconstructed based on emission data$_{20}$. Loss layer component 360 compares mu-map$_{g20}$ to mu-map$_{20}$, which was generated based on CT data$_{20}$ corresponding to emission data$_{20}$.

The total loss is back-propagated from loss layer component 360 to network 340. The loss may comprise an L1 loss, and L2 loss, or any other suitable measure of total loss. An L1 loss is the sum of the absolute differences between each output mu-map and its corresponding ground truth mu-map, and an L2 loss is the sum of the squared differences between each output mu-map and its corresponding ground truth mu-map.

The loss is back-propagated to network 340, which changes its internal weights, or kernel parameter values, as is known in the art. The training data is again processed by network 340 and loss layer 360 as described above, and the process repeats, until it is determined that the loss has reached an acceptable level or training otherwise terminates. At termination, the convolution kernels of network 340 may be considered trained. The parameter values of the trained convolutional kernels may then be deployed in a convolutional network as shown in FIG. 2 in order to generate attenuation-corrected volumes based on emission data, and without requiring a CT data-generated mu-map.

Figure 6:
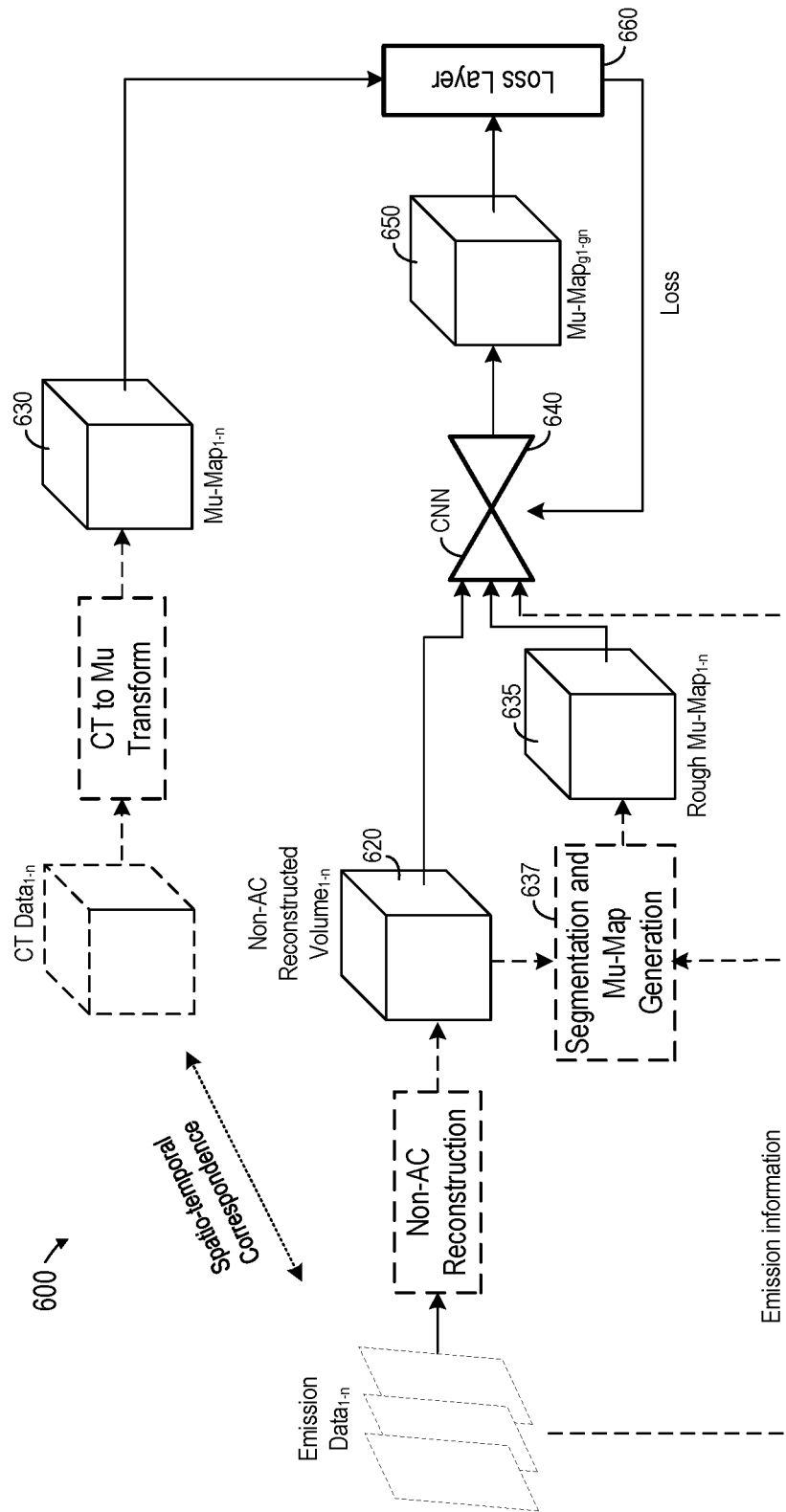
FIG. 6 is a block diagram of a system to train a convolutional neural network to output a linear attenuation coefficient map according to some embodiments.

FIG. 6 illustrates training architecture 600 according to some embodiments. Training architecture 600 may comprise an implementation of process 400. For example, convolutional network 640 of architecture 600 may be trained based on a plurality of non-attenuation-corrected volumes$_{1-n}$ 620 corresponding to a respective plurality of sets of emission data$_{1-n}$, and on a plurality of linear attenuation coefficient maps$_{1-n}$ 630 also corresponding to respective ones of the plurality of sets of emission data$_{1-n}$.

Unlike network 340 of FIG. 3, network 640 also receives as input a "rough", or estimated linear attenuation coefficient map 635. Such a map is generated by segmentation and mu-map generation unit 637 based on a corresponding input non-attenuation-corrected volume 620. The segmentation and mu-map generation may proceed as is known in the art. Therefore, for each set of emission data, network 640 receives a non-attenuation-corrected volume$_x$ generated therefrom and a rough mu-map$_x$ generated from the non-attenuation-corrected volume$_x$, generates a mu-map$_{gx}$, and compares generated mu-map$_{gx}$ against ground truth mu-map$_x$ which was generated based on CT data$_x$ corresponding to emission data$_x$. Loss layer 660 determines a loss based on the comparison for each x=1 through n.

In some embodiments, network 640 also receives emission information related to the generation and/or acquisition of respective emission data. The emission information is provided by the detector which is used to obtain the emission data. The detector records position, time and energy of the event along with ancillary information such as location and orientation of the detector and physiological triggers, for example. Such information is generally stored in a suitable format and accessible by the system. Subsequently, processing may be used to extract further information, as shown, the emission information may optionally be used to inform the segmentation and rough mu-map generation.

The use of additional inputs to the convolutional network, in comparison to network 340, may result in an increased accuracy (i.e., decreased loss) of network 640 after training. Increased accuracy in generating a mu-map from input emission data may result in a more accurate subsequent volume reconstruction based on the mu-map.

Figure 7:
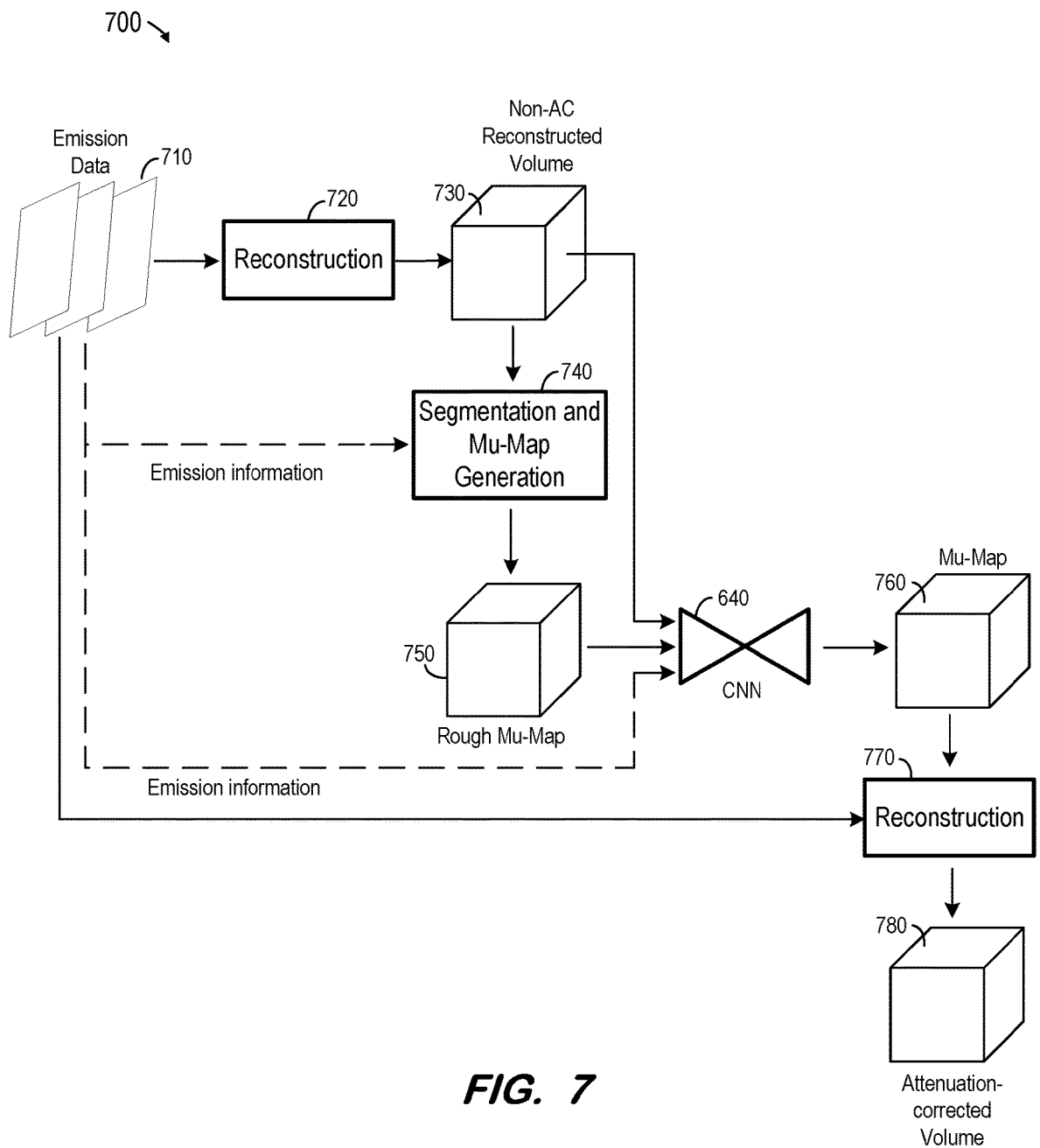
FIG. 7 is a block diagram of a system to generate an attenuation-corrected image volume based on emission data and a trained convolutional neural network according to some embodiments.

In this regard, FIG. 7 illustrates deployment of trained network 640 in architecture 700 to generate an attenuation-corrected volume based on emission data according to some embodiments. Trained network 640 of architecture 700 may implement convolutional kernel parameter values learned as described above with respect to FIG. 6. The hardware and software implementing network 640 of FIG. 7 may differ from the implementation of network 640 of FIG. 6.

Emission data 710 is received by reconstruction unit 720, which performs a reconstruction operation on emission data 710 and outputs non-attenuation-corrected reconstructed volume 730. Segmentation and mu-map generation unit 740 segments volume 730 and generates rough mu-map 750. Operation of unit 740 may be influenced by emission information relating to the acquisition of emission data 710 in some embodiments. Volume 730 and rough mu-map 750 are input to trained network 640. The aforementioned emission information may be input to network 640 if network 640 was trained based on such emission information.

Network 640 generates mu-map 760 based on its received inputs. Reconstruction unit 770 then generates attenuation-corrected volume 780 of the subject using emission data 710 and mu-map 760. As in architecture 200, attenuation-corrected volume 780 is advantageously generated without requiring a CT scan of the subject.

Figure 8:
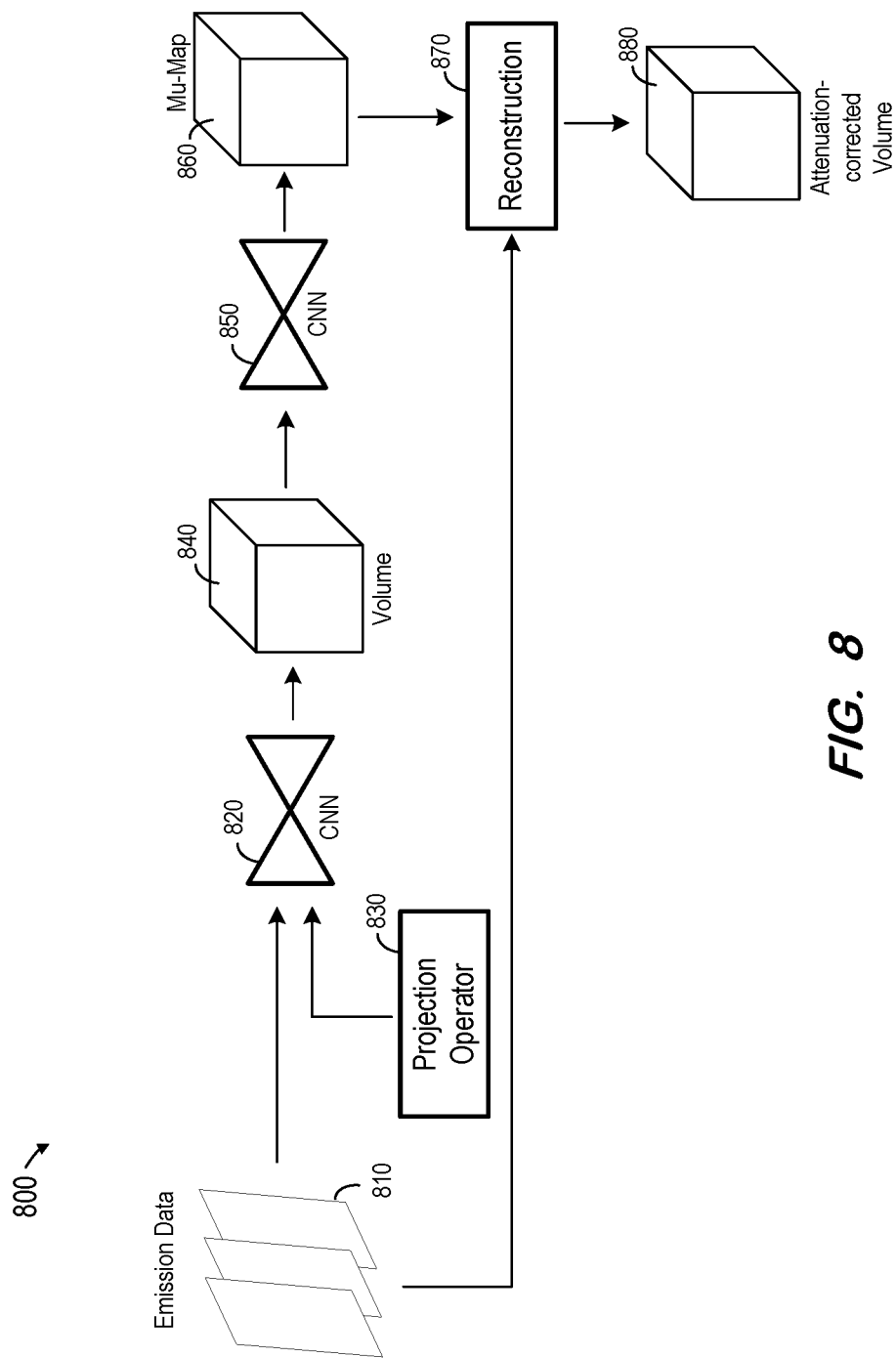
FIG. 8 is a block diagram of a system to generate an attenuation-corrected image volume based on emission data and two trained convolutional neural networks according to some embodiments.

FIG. 8 illustrates architecture 800 for generating an attenuation-corrected volume based on emission data according to some embodiments. Similarly to architecture 200 and architecture 700 described above, architecture 800 generates the volume without requiring CT data. In contrast to architecture 200 and architecture 700, architecture 800 includes two trained convolutional networks.

In operation, emission data 810 is received by trained network 820. Also input to trained network 820 may be projection operator 830, corresponding to emission data 810. Projection operator 830 transforms image space to data space, and is a representation of the system matrix. The system matrix is an approximate description of the actual physical imaging system. The activity distribution in the body is estimated using the inverse of the system matrix, and thus tomography falls within the general class of inverse problems.

Network 820 generates volume 840 based on its received inputs and on its previously-trained kernel parameter values. Training of network 820 and network 850 of architecture 800 will be described below with respect to FIGS. 9 through 11. Trained network 850 receives volume 840 and outputs mu-map 860. Reconstruction unit 870 generates attenuation-corrected volume 880 using emission data 810 and mu-map 860.

Figure 9:
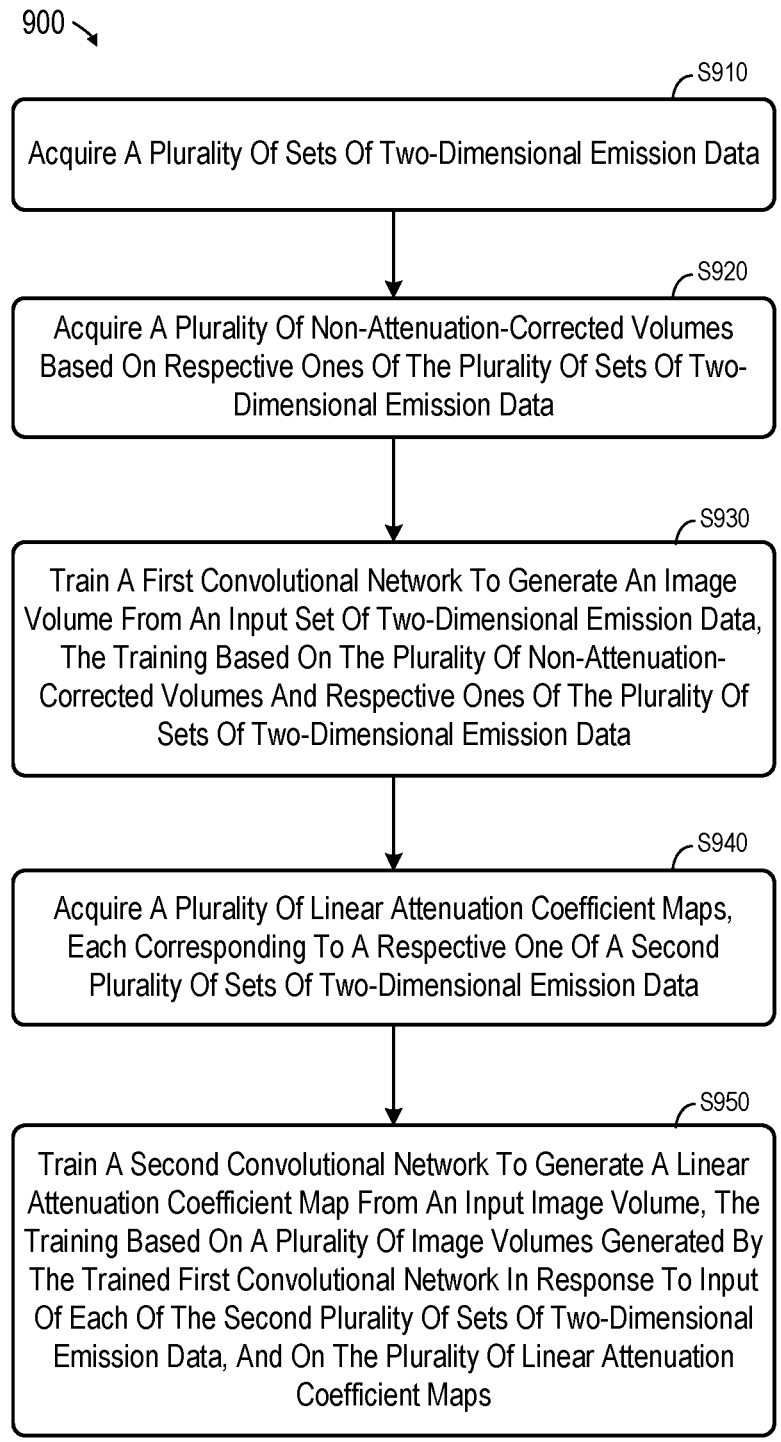
FIG. 9 is a flow diagram of a network training process according to some embodiments.

FIG. 9 is a flow diagram of process 900 to train networks for use in an architecture such as architecture 800 according to some embodiments.

Figure 10:
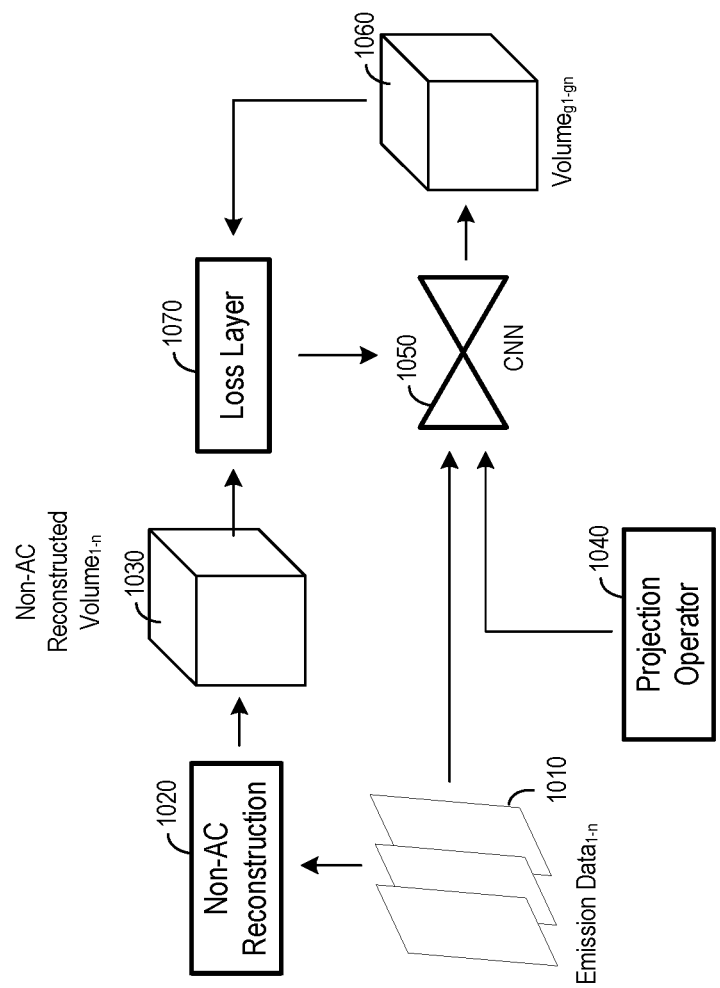
FIG. 10 is a block diagram of a system to train a first stage convolutional neural network to output an image volume according to some embodiments.

Initially, at S910, a plurality of sets of two-dimensional emission data are acquired. FIG. 10 depicts sets of emission data$_{1-n}$ 1010 which may be acquired from a SPECT, PET, or other emission-based imaging system according to some embodiments. Next, at S920, a plurality of non-attenuation-corrected volumes are acquired based on respective ones of the plurality of sets of two-dimensional emission data. According to the FIG. 10 example, the plurality of non-attenuation-corrected volumes$_{1-n}$ 1030 are acquired by performing, using reconstruction unit 1020, a reconstruction operation on each set of emission data$_{1-n}$ 1010.

A first convolutional network is trained at S930 to generate an image volume from an input set of two-dimensional image data. As depicted in FIG. 10, this training of first convolutional network 1050 may be based on the plurality of non-attenuation-corrected volumes$_{1-n}$ 1030 and respective ones of the plurality of sets of two-dimensional emission data$_{1-n}$ 1010 acquired at S920 and S910, respectively.

In particular, network 1050 receives sets of emission data$_{1-n}$ 1010 and projection operator 1040 and generates a volume$_{g1-gn}$ 1060 for each set of received emission data 1010. Loss layer component 1070 determines a loss by comparing each generated volume$_{g1-gn}$ 1060 to a corresponding "ground truth" volume$_{1-n}$ 1030. For example, network 1050 generates volume$_{g10}$ based on emission data$_{10}$. Loss layer component 1060 compares volume$_{g10}$ to volume$_{10}$, which was reconstructed from emission data$_{10}$. The total loss is back-propagated from loss layer component 1070 to network 1050 and training continues as is known in the art.

Figure 11:
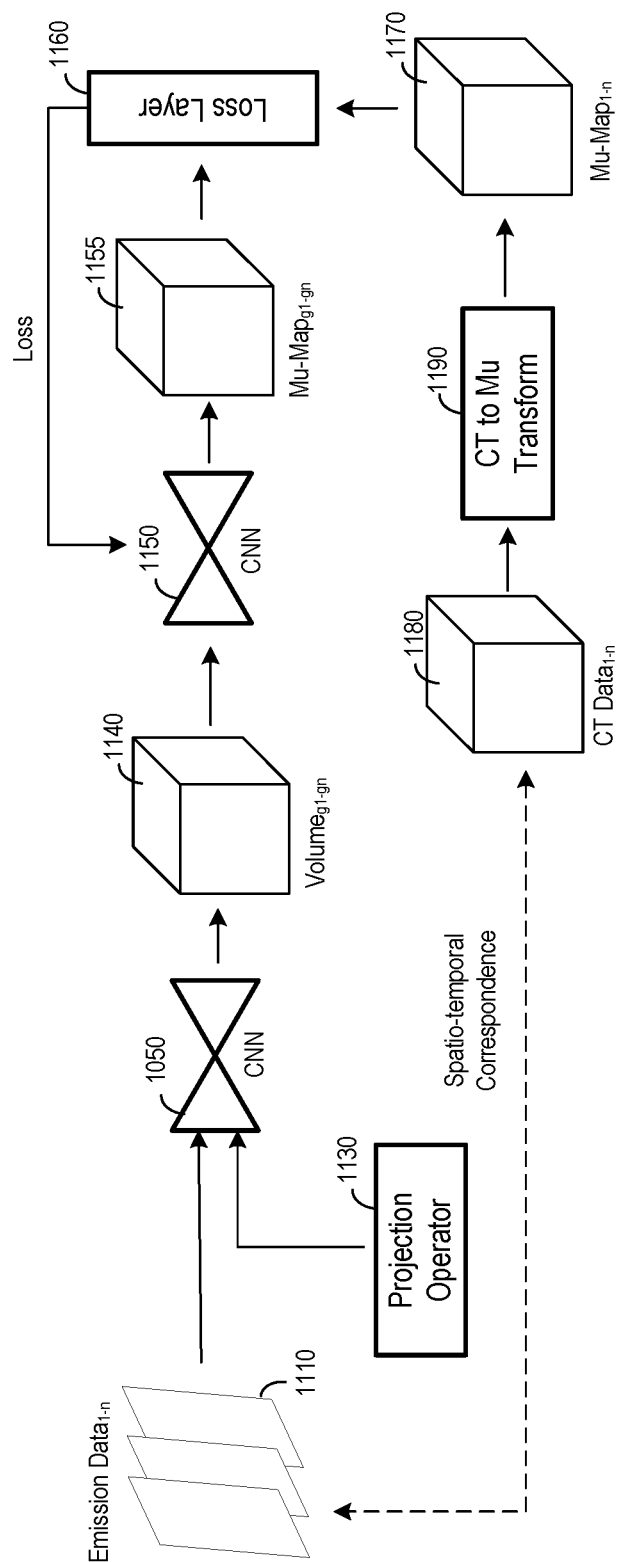
FIG. 11 is a block diagram of a system to train a second stage convolutional neural network to output a linear attenuation coefficient map according to some embodiments.

At S940, a plurality of linear attenuation coefficient maps are acquired. Each acquired map corresponds to a respective one of a second plurality of sets of two-dimensional emission data. FIG. 11 illustrates the acquisition of a plurality of mu-maps$_{1-n}$ 1170 based on CT data$_{1-n}$ 1180 and using CT to Mu transform unit 1190 as is known in the art. Each of CT data$_{1-n}$ 1180 corresponds to a respective set of emission data$_{1-n}$ 1110, therefore each of mu-maps$_{1-n}$ 1170 corresponds to a respective set of emission data$_{1-n}$ 1110.

A second convolutional network is trained at S950 to generate a linear attenuation coefficient map from an input image volume. The training is based on a plurality of image volumes generated by the trained first convolutional network. Moreover, the plurality of image volumes are generated by the trained first convolutional network in response to input of each of the second plurality of sets of two-dimensional emission data and a respective one of a second plurality of non-attenuation-corrected volumes.

FIG. 11 depicts training at S950 according to some embodiments. First convolutional network 1050, which will be assumed to have been trained at S930 as described above, receives a second plurality of sets of emission data$_{1-n}$ 1110. Based on the received emission data$_{1-n}$ 1110 and its trained convolution kernel parameters (and, in some embodiments, on respective projection operators 1130), network 1050 generates a respective volume$_{g1-gn}$ 1140, each of which corresponds to a respective one of the second plurality of sets of emission data$_{1-n}$ 1110.

Image volumes$_{g1-gn}$ 1140 are used to train network 1150 based on mu-maps$_{1-n}$ 1170 as described above with respect to S430 and FIG. 3. Upon completion of such training, network 1150 is trained to generate a mu-map based on an input image volume. Moreover, network 1150 is trained to generate a mu-map based on an image volume generated by trained network 1050. Networks 1050 and 1150 may thereafter be deployed in an architecture such as architecture 800 to generate attenuation-corrected volumes based on input emission data, and without requiring CT data.

Figure 12:
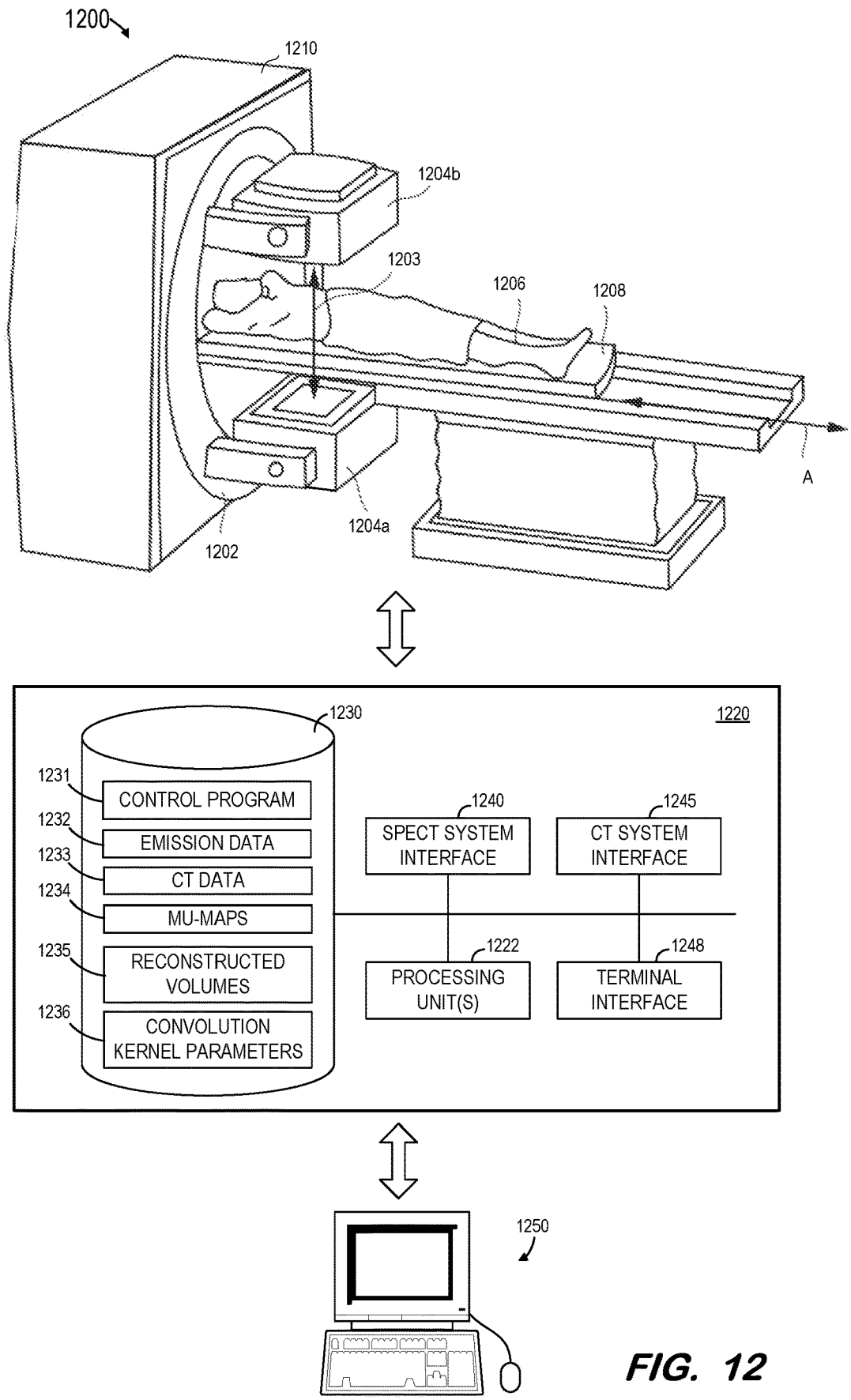
FIG. 12 illustrates a dual transmission and emission imaging system according to some embodiments.

FIG. 12 illustrates SPECT-CT system 1200 to execute process 400 and/or 900 as described above. System 1200 may further deploy the trained convolutional network(s) to acquire emission data and generate attenuation-corrected volumes as described herein.

System 1200 includes gantry 1202 to which two or more gamma cameras 1204a, 1204b are attached, although any number of gamma cameras can be used. A detector within each gamma camera detects gamma photons (i.e., emission data) emitted by a radioisotope within the body of a patient 1206 lying on a bed 1208. Bed 1208 is slidable along axis-of-motion A. At respective bed positions (i.e., imaging positions), a portion of the body of patient 1206 is positioned between gamma cameras 1204a, 1204b in order to capture emission data from that body portion.

System 1200 also includes CT housing 1210 including an X-ray imaging system (unshown) as is known in the art. Generally, and according to some embodiments, the X-ray imaging system acquires two-dimensional X-ray images of patient 1206 before, during and/or after acquisition of emission data using gamma cameras 1204a and 1204b.

Control system 1220 may comprise any general-purpose or dedicated computing system. Accordingly, control system 1220 includes one or more processing units 1222 configured to execute processor-executable program code to cause system 1220 to operate as described herein, and storage device 1230 for storing the program code. Storage device 1230 may comprise one or more fixed disks, solid-state random access memory, and/or removable media (e.g., a thumb drive) mounted in a corresponding interface (e.g., a USB port).

Storage device 1230 stores program code of system control program 1231. One or more processing units 1222 may execute system control program 1231 to, in conjunction with SPECT system interface 1240, control motors, servos, and encoders to cause gamma cameras 1204a, 1204b to rotate along gantry 1202 and to acquire two-dimensional emission data at defined imaging positions during the rotation. The acquired data 1232 may be stored in memory 1230.

One or more processing units 1222 may also execute system control program 1231 to, in conjunction with CT system interface 1245, cause a radiation source within CT housing 1210 to emit radiation toward body 1206 from different projection angles, to control a corresponding detector to acquire two-dimensional CT images, and to reconstruct three-dimensional CT images from the acquired images. The CT images may be acquired substantially contemporaneously with the emission data as described above, and the reconstructed images may be stored as CT data 1233.

Control program 1231 may be further executed to generate mu-maps 1234 from CT data 1233, and to reconstruct reconstructed volumes 1235 from emission data 1232. Mu-maps 1234 and reconstructed volumes 1235 may then be used to train a convolutional network as described above. Convolution kernel parameters 1236 may include the trained parameters of such a network.

After training of parameters 1236, system 1200 may be operated to acquire emission data and reconstruct a non-attenuation-corrected volume based on the emission data. The volume is then input to a network implemented trained parameters 1236 to generate a mu-map. The mu-map is used to reconstruct an attenuation-corrected volume from the emission data.

The reconstructed attenuation-corrected volume may be transmitted to terminal 1250 via terminal interface 1248. Terminal 1250 may comprise a display device and an input device coupled to system 1220. Terminal 1250 may display any of two-dimensional emission data, CT data, mu-maps, etc., and may receive user input for controlling display of the data, operation of imaging system 1200, and/or the processing described herein. In some embodiments, terminal 1250 is a separate computing device such as, but not limited to, a desktop computer, a laptop computer, a tablet computer, and a smartphone.

According to some embodiments, a first system is used to acquire the emission data and the CT data used to train the convolutional network(s), a second system is used to train the convolutional network(s), and the trained convolutional networks are deployed by one or more other systems to generate attenuation-corrected volumes without requiring CT data.

Each of component of system 1200 may include other elements which are necessary for the operation thereof, as well as additional elements for providing functions other than those described herein.

Figure 13:
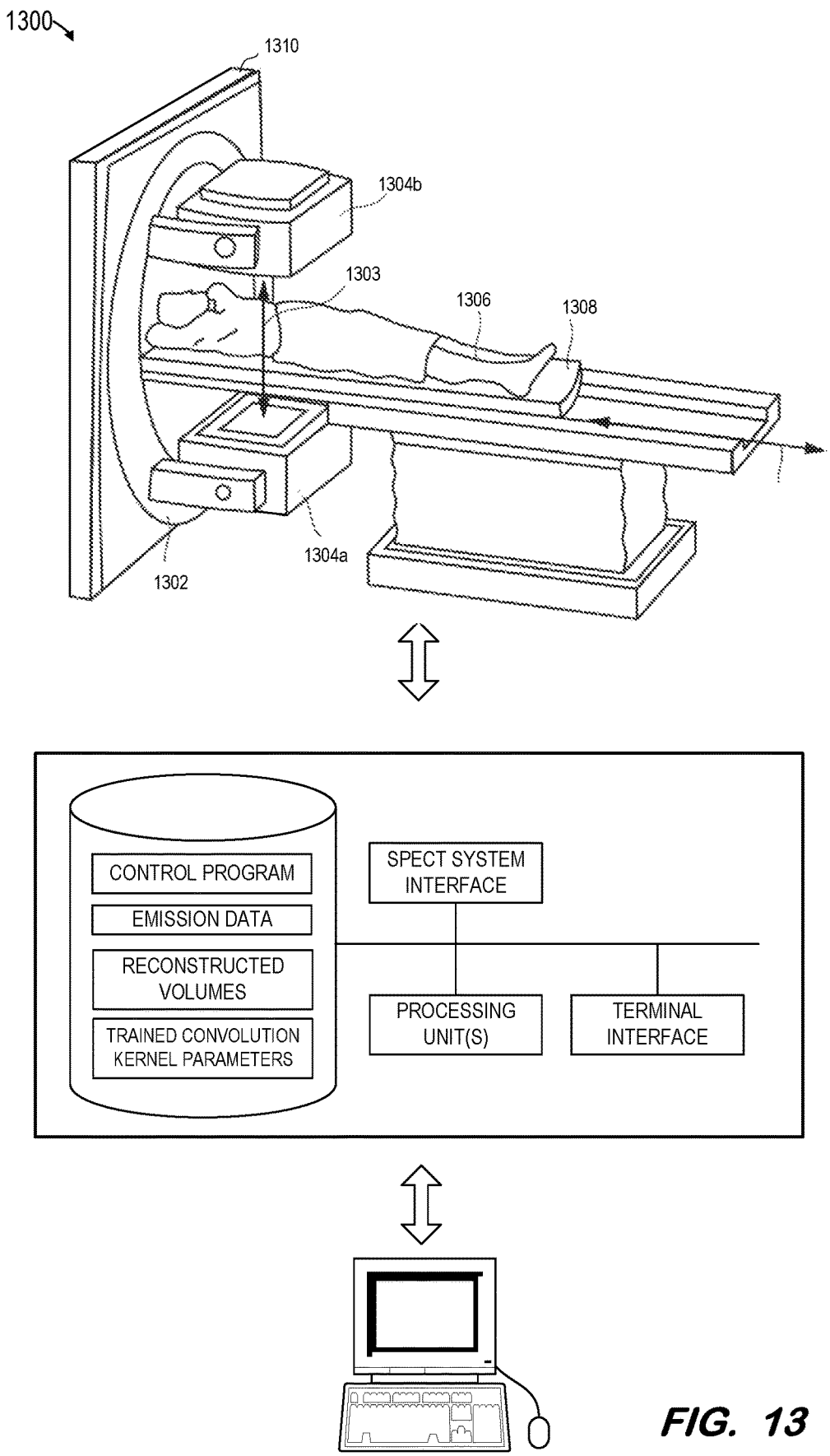
FIG. 13 illustrates an emission imaging system according to some embodiments.

FIG. 13 illustrates system 1300 according to some embodiments. System 1300 is a SPECT system which does not include a CT imaging system. System 1300 may acquire pre-trained convolution kernel parameters and use the parameters to generate attenuation-corrected volumes without requiring CT data.

Embodiments are not limited to a SPECT imaging system and/or a CT imaging system as described above. For example, embodiments may employ any other imaging modalities (e.g., a magnetic resonance scanner, a positron-emission scanner, etc.) for acquiring emission data.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
a storage device;
a processor to execute processor-executable process steps stored on the storage device to cause the system to:
acquire a plurality of non-attenuation-corrected volumes, each of the non-attenuation-corrected volumes based on a respective one of a plurality of sets of two-dimensional emission data;
acquire a plurality of attenuation coefficient maps, each of the plurality of attenuation coefficient maps corresponding to a respective one of the plurality of sets of two-dimensional emission data;
train a convolutional network to generate an attenuation coefficient map from an input image volume, the training based on the plurality of non-attenuation-corrected volumes and respective ones of the plurality of attenuation coefficient maps; and
output trained kernels of the trained convolutional network to an emission imaging system.

2. The system according to claim 1, the processor to execute processor-executable process steps to cause the system to:
reconstruct each of the non-attenuation-corrected volumes based on a respective one of the plurality of sets of two-dimensional emission data.

3. The system according to claim 1, further comprising the emission imaging system, the emission imaging system to:
acquire a set of two-dimensional emission data;
reconstruct a non-attenuation-corrected volume based on the set of two-dimensional emission data;
input the non-attenuation-corrected volume to a second convolutional network comprising the trained kernels;
receive an attenuation coefficient map output from the second convolutional network based on the input non-attenuation-corrected volume; and
reconstruct an attenuation-corrected volume based on the received attenuation coefficient map and the set of two-dimensional emission data.

4. The system according to claim 1, the processor to execute processor-executable process steps to cause the system to:
generate, based on each of the non-attenuation-corrected volumes, respective ones of a plurality of rough attenuation coefficient maps,
wherein training of the convolutional network is based on the plurality of non-attenuation-corrected volumes, respective ones of the plurality of rough attenuation coefficient maps, and respective ones of the plurality of attenuation coefficient maps.

5. The system according to claim 4, further comprising the emission imaging system, the emission imaging system to:
acquire a set of two-dimensional emission data;
reconstruct a non-attenuation-corrected volume based on the set of two-dimensional emission data;
generate a rough attenuation coefficient map based on the non-attenuation-corrected volume
input the non-attenuation-corrected volume and the rough attenuation coefficient map to a second convolutional network comprising the trained kernels;
receive an attenuation coefficient map output from the second convolutional network based on the input non-attenuation-corrected volume; and
reconstruct an attenuation-corrected volume based on the received attenuation coefficient map and the set of two-dimensional emission data.

6. The system according to claim 5, wherein generation of the plurality of rough attenuation coefficient maps is based on emission information associated with respective ones of the plurality of sets of emission information, and
wherein training of the convolutional network is based on the plurality of non-attenuation-corrected volumes, respective ones of the plurality of rough attenuation coefficient maps, the emission information associated with respective ones of the plurality of sets of emission information, and respective ones of the plurality of attenuation coefficient maps, and
wherein emission information associated with the set of emission information is input to the second convolutional network with the non-attenuation-corrected volume and the rough attenuation coefficient map.

7. A method comprising:
acquiring a plurality of non-attenuation-corrected volumes, each of the non-attenuation-corrected volumes based on a respective one of a plurality of sets of two-dimensional emission data;
acquiring a plurality of attenuation coefficient maps, each of the plurality of attenuation coefficient maps corresponding to a respective one of the plurality of sets of two-dimensional emission data;
training a convolutional network to generate an attenuation coefficient map from an input image volume, the training based on the plurality of non-attenuation-corrected volumes and respective ones of the plurality of attenuation coefficient maps; and
outputting trained kernels of the trained convolutional network to an emission imaging system.

8. The method according to claim 7, further comprising:
reconstructing each of the non-attenuation-corrected volumes based on a respective one of the plurality of sets of two-dimensional emission data.

9. The method according to claim 7, further comprising:
acquiring a set of two-dimensional emission data;
reconstructing a non-attenuation-corrected volume based on the set of two-dimensional emission data;
inputting the non-attenuation-corrected volume to a second convolutional network comprising the trained kernels;
receiving an attenuation coefficient map output from the second convolutional network based on the input non-attenuation-corrected volume; and
reconstructing an attenuation-corrected volume based on the received attenuation coefficient map and the set of two-dimensional emission data.

10. The method according to claim 7, further comprising:
generating, based on each of the non-attenuation-corrected volumes, respective ones of a plurality of rough attenuation coefficient maps,
wherein training the convolutional network is based on the plurality of non-attenuation-corrected volumes, respective ones of the plurality of rough attenuation coefficient maps, and respective ones of the plurality of attenuation coefficient maps.

11. The method according to claim 10, further comprising:
acquiring a set of two-dimensional emission data;
reconstructing a non-attenuation-corrected volume based on the set of two-dimensional emission data;
generating a rough attenuation coefficient map based on the non-attenuation-corrected volume
inputting the non-attenuation-corrected volume and the rough attenuation coefficient map to a second convolutional network comprising the trained kernels;
receiving an attenuation coefficient map output from the second convolutional network based on the input non-attenuation-corrected volume; and
reconstructing an attenuation-corrected volume based on the received attenuation coefficient map and the set of two-dimensional emission data.

12. The method according to claim 11, wherein generating the plurality of rough attenuation coefficient maps is based on emission information associated with respective ones of the plurality of sets of emission information, and
wherein training the convolutional network is based on the plurality of non-attenuation-corrected volumes, respective ones of the plurality of rough attenuation coefficient maps, the emission information associated with respective ones of the plurality of sets of emission information, and respective ones of the plurality of attenuation coefficient maps, and
wherein emission information associated with the set of emission information is input to the second convolutional network with the non-attenuation-corrected volume and the rough attenuation coefficient map.

13. A system comprising:
a storage device;
a processor to execute processor-executable process steps stored on the storage device to cause the system to:
acquire a plurality of non-attenuation-corrected volumes, each of the non-attenuation-corrected volumes based on a respective one of a plurality of sets of two-dimensional emission data;
train a first convolutional network to generate an image volume from an input set of two-dimensional emission data, the training based on the plurality of non-attenuation-corrected volumes and respective ones of the plurality of sets of two-dimensional image data;
acquire a plurality of attenuation coefficient maps, each of the plurality of attenuation coefficient maps corresponding to a respective one of a second plurality of sets of two-dimensional emission data;
train a second convolutional network to generate an attenuation coefficient map from an input image volume, the training based on a plurality of volumes generated by the first convolutional network in response to input to the first convolutional network of each of the second plurality of sets of two-dimensional emission data, and on the plurality of attenuation coefficient maps; and output first trained kernels of the first trained convolutional network and second trained kernels of the second trained convolutional network to an emission imaging system.

14. The system according to claim 13, the processor to execute processor-executable process steps to cause the system to:
reconstruct each of the non-attenuation-corrected volumes based on a respective one of the plurality of sets of two-dimensional emission data.

15. The system according to claim 14, further comprising the emission imaging system, the emission imaging system to:
acquire a set of two-dimensional emission data;
input the set of two-dimensional emission data to a third convolutional network comprising the first trained kernels of the first trained convolutional network;
receive an image volume output from the third convolutional network based on the input set of two-dimensional emission data;
input the image volume to a fourth convolutional network comprising the second trained kernels of the second trained convolutional network;
receive an attenuation coefficient map output from the fourth convolutional network based on the input image volume; and
reconstruct an attenuation-corrected volume based on the received attenuation coefficient map and the set of two-dimensional emission data.

16. The system according to claim 13, the processor to execute processor-executable process steps to cause the system to:
determine a projection operator associated with the plurality of sets of emission data,
wherein training of the first convolutional network is based on the plurality of non-attenuation-corrected volumes, respective ones of the plurality of sets of two-dimensional image data, and the projection operator.

17. The system according to claim 16, further comprising the emission imaging system, the emission imaging system to:
acquire a set of two-dimensional emission data;
determine a projection operator corresponding to the acquired set of two-dimensional emission data;
input the set of two-dimensional emission data and the projection operator to a third convolutional network comprising the first trained kernels of the first trained convolutional network;
receive an image volume output from the third convolutional network based on the input set of two-dimensional emission data;
input the image volume to a fourth convolutional network comprising the second trained kernels of the second trained convolutional network;
receive an attenuation coefficient map output from the fourth convolutional network based on the input image volume; and
reconstruct an attenuation-corrected volume based on the received attenuation coefficient map and the set of two-dimensional emission data.

* * * * *